(12) United States Patent
Gojyo et al.

(10) Patent No.: US 9,851,884 B2
(45) Date of Patent: Dec. 26, 2017

(54) INFORMATION PROCESSING DEVICE

(71) Applicant: Panasonic Corporation, Osaka (JP)

(72) Inventors: Azusa Gojyo, Kanagawa (JP); Kenji Nishimura, Kanagawa (JP); Toshiaki Mori, Kanagawa (JP); Junichi Sato, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 495 days.

(21) Appl. No.: 14/358,545

(22) PCT Filed: Nov. 7, 2012

(86) PCT No.: PCT/JP2012/007143
§ 371 (c)(1),
(2) Date: May 15, 2014

(87) PCT Pub. No.: WO2013/080448
PCT Pub. Date: Jun. 6, 2013

(65) Prior Publication Data
US 2014/0325446 A1     Oct. 30, 2014

(30) Foreign Application Priority Data

Dec. 1, 2011  (JP) .................................. 2011-263959

(51) Int. Cl.
G06F 3/0484     (2013.01)
G06F 17/30      (2006.01)

(52) U.S. Cl.
CPC ...... G06F 3/04847 (2013.01); G06F 3/04842 (2013.01); G06F 17/30389 (2013.01)

(58) Field of Classification Search
None
See application file for complete search history.

(56) References Cited

U.S. PATENT DOCUMENTS 5,515,488 A * 5/1996 Hoppe .............. G06F 17/30572
                                                    345/440
6,544,123 B1   4/2003 Tanaka et al.
(Continued)

FOREIGN PATENT DOCUMENTS

JP   2000-284879   10/2000
JP   2002-287950   10/2002
(Continued)

OTHER PUBLICATIONS

International Search Report dated Jan. 15, 2013 in International Application No. PCT/JP2012/007143.
(Continued)

Primary Examiner — Phenuel Salomon
(74) Attorney, Agent, or Firm — Wenderoth, Lind & Ponack, L.L.P.

(57) ABSTRACT

An information processing device 10 is provided with a first option group area where a slide operation of options of a first search criterion can be performed and a second option group area where a slide operation of options of a second search criterion can be performed, a slide operation performed in a direction different from that of the above-mentioned slide operation to switch the display of hierarchical options of the first search criterion can be performed in the first option group area, and a selection area is provided including a predetermined number of options of the first search criterion and a predetermined number of options of the second search criterion.

5 Claims, 11 Drawing Sheets

(56) References Cited

U.S. PATENT DOCUMENTS

| | | | | |
|---|---|---|---|---|
| 7,523,099 B1* | 4/2009 | Egnor | | G06F 17/30707 |
| 7,801,419 B2* | 9/2010 | Sakai | | G06F 3/04817 |
| | | | | 386/241 |
| 8,676,796 B2* | 3/2014 | Kulakow | | G06F 17/30646 |
| | | | | 707/731 |
| 2002/0149631 A1* | 10/2002 | Mugura | | G06F 3/0236 |
| | | | | 715/864 |
| 2002/0199194 A1* | 12/2002 | Ali | | H04N 5/44543 |
| | | | | 725/46 |
| 2005/0210410 A1* | 9/2005 | Ohwa | | G06F 3/0482 |
| | | | | 715/821 |
| 2006/0069997 A1 | 3/2006 | Hsieh et al. | | |
| 2006/0224938 A1* | 10/2006 | Fikes | | G06F 17/30876 |
| | | | | 715/234 |
| 2006/0242164 A1* | 10/2006 | Evans | | G06F 17/30126 |
| 2007/0016469 A1* | 1/2007 | Bae | | G06Q 30/02 |
| | | | | 705/14.54 |
| 2008/0141172 A1* | 6/2008 | Yamamoto | | G06F 3/0482 |
| | | | | 715/835 |
| 2008/0204402 A1* | 8/2008 | Hirata | | G06F 3/0481 |
| | | | | 345/156 |
| 2010/0058228 A1* | 3/2010 | Park | | G06F 3/04847 |
| | | | | 715/786 |
| 2010/0251181 A1 | 9/2010 | Lal | | |
| 2011/0074674 A1* | 3/2011 | Walberg | | G06F 3/0418 |
| | | | | 345/158 |
| 2011/0145705 A1 | 6/2011 | Cheng et al. | | |
| 2011/0249898 A1* | 10/2011 | Lee | | G06F 1/1626 |
| | | | | 382/187 |
| 2012/0075194 A1* | 3/2012 | Ferren | | G02B 13/0065 |
| | | | | 345/168 |
| 2013/0129144 A1* | 5/2013 | Chang | | G06K 9/62 |
| | | | | 382/103 |
| 2014/0145705 A1 | 5/2014 | Hwang et al. | | |

FOREIGN PATENT DOCUMENTS

| | | |
|---|---|---|
| JP | 2005-267390 | 9/2005 |
| JP | 2008-204402 | 9/2008 |
| JP | 2010-79767 | 4/2010 |
| JP | 2010-238240 | 10/2010 |
| JP | 2011-107783 | 6/2011 |
| JP | 2011-180990 | 9/2011 |

OTHER PUBLICATIONS

Office Action dated Jun. 26, 2017 in European Patent Application No. 12 854 008.5.

* cited by examiner (a)

(b)

(c)

(a)

(b)

(c)

(a)

(b)

(c)

INFORMATION PROCESSING DEVICE

TECHNICAL FIELD

The present invention relates to an information processing device that searches predetermined information accumulated in a database for desired information.

BACKGROUND ART

As a conventional information processing device, in radio communication apparatuses such as mobile telephones and electronic apparatuses such as digital cameras and PDAs (personal digital assistants), a device is known where a function menu is displayed on a display screen of a display portion and various functions can be executed by the user performing a selection operation on the function menu (for example, see Patent Document 1).

As another conventional information processing device, in terminal apparatuses provided with an information search system, a device is available where to search for an optimum route between a departure place and a destination, a first search criterion (departure place) and a second search criterion (destination) are displayed side by side so as to be selectable (for example, see Patent Document 2).

PRIOR ART DOCUMENT

Patent Document

Patent Document 1: JP-A-2011-180990 (FIG. 4)
Patent Document 2: JP-A-2011-107783

SUMMARY OF THE INVENTION

Problems that the Invention is to Solve

However, in the conventional information processing device described in Patent Document 1, the function menu of the first hierarchy is displayed in a circular form in the lower left corner of the display screen and when the user selects an item of the function menu of the first hierarchy, the function menu of the second hierarchy of the selected item is displayed in a circular form in the lower right corner of the display screen. This presents a problem in that it is necessary for the user to operate the multi-hierarchical function menu along the hierarchy in a step-by-step manner until obtaining a desired result.

In the device described in Patent Document 2, although search with two different search criteria can be performed, no consideration is given to a hierarchical change of the search criteria.

The present invention is made to solve the conventional problems, and an object thereof is to provide an information processing device with which a search operation using a hierarchically structured search criterion and a search criterion different from the search criterion can be easily selected on one screen.

Means for Solving the Problem

To attain the above-mentioned object, the present invention has a structure in which the following are provided: an operation detector that detects a slide operation in an operation area; and a display controller that changes information that the own device displays in a display area according to a result of the detection by the operation detector, the display area includes: first option areas for selecting options indicating a first search criterion; a first option group area having the first option areas; second option areas for selecting options indicating a second search criterion; a second option group area having the second option areas; and a selection area which is a region including only the first option areas of a predetermined number and the second option areas of a predetermined number, wherein the operation detector detects, as an operation direction of the slide operation, a first direction which is a direction in which the first option group area is operated, a second direction which is a direction in which the second option group area is operated and a third direction which is a direction different from the first direction and in which the first option group area is operated, and wherein when the operation detector detects that the slide operation is performed in the third direction, the display controller displays, in the first option group area, an option of an upper hierarchy or a lower hierarchy of an option of the first search criterion which has been displayed in the selection area before the operation.

Advantage of the Invention

According to the present invention, a search operation using a hierarchically structured search criterion and a search criterion different from the search criterion can be easily selected on one screen.

MODE FOR CARRYING OUT THE INVENTION

First Embodiment

Hereinafter, an information processing device according to a first embodiment of the present invention will be described with reference to the drawings.

Figure 1:
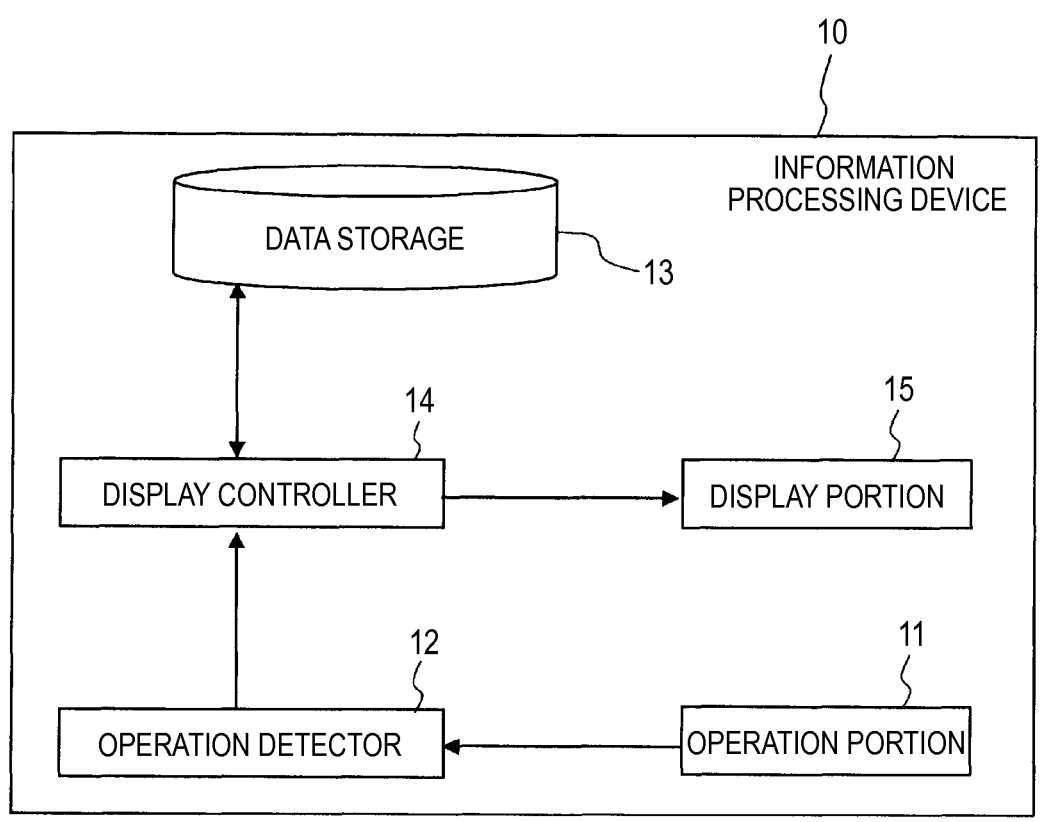
FIG. 1 is a block diagram showing the structure of an information processing device according to a first embodiment of the present invention.

FIG. 1 is a block diagram showing the structure of the information processing device according to the first embodiment of the present invention.

In FIG. 1, the information processing device 10 is provided with an operation portion 11 that accepts an input operation from the user and an operation detector 12 that detects the input operation from the user accepted by the operation portion 11. Moreover, the information processing device 10 is provided with a data storage 13 that stores information on options (option data) for the user to select from as a search criterion, a display controller 14 that controls the information displayed on a display portion 15 in accordance with the user's input operation detected by the operation detector 12, and the display portion 15 that displays information based on the control by the display controller 14. The display portion 15 displays search criteria options for the user to select from at the time of a search operation and a search result matching the criterion of the selected option.

The operation portion 11 is formed of a touch panel or the like disposed on the upper surface of the display portion 15 described later in detail. The operation portion 11 formed of a touch panel is for performing an input operation (for accepting an input operation) by using the user's finger or by the user using a stylus pen on a screen display formed of characters, images, video, a combination thereof or the like displayed on the display portion 15. An example of a case where a touch panel is used as the operation portion 11 will be described below.

The operation portion 11 may be formed of a structure where, for example, a plurality of elements for detecting the input operation are disposed on the display portion 15 and a transparent screen is further overlaid on the elements.

When a touch operation, for example, is performed as an input operation on the operation portion 11, the operation portion 11 detects the pressure applied to the touch panel of the operation portion by the touch operation, a change in capacitance and the like, generates a signal indicating the detected position (coordinates), and outputs it to the operation detector 12.

The operation detector 12 analyzes an input operation of a touch operation such as a gesture performed on the touch panel of the operation portion 11 or a key operation, replaces it with an operation instruction (command) corresponding to the operation input, and outputs it to the display controller 14.

The operation detector 12 analyzes the user's operation input, for example, based on the position where the touch operation was performed on the operation portion 11, the movement amount and the like, and outputs an operation instruction such as a search or a selection corresponding to the user operation. In this case, when a slide operation (tracing operation) was performed on the operation portion 11 by the user, the operation detector 12 also detects the operation direction.

The data storage 13 is formed of a storage device such as a data readable and writable semiconductor memory. The data storage 13 stores programs executed by the display controller 14 and information of the items of the options used for the programs and the number of items, and stores information of the hierarchy of the options.

The display controller 14 is formed of a CPU, a DSP, a RAM, a ROM and the like, and executes predetermined processing by the CPU or the DSP using a computer program stored in the ROM with the RAM as the work area. The program stored in the RAM is a program for causing the CPU to execute flow processing described later in detail.

According to the instruction outputted from the operation detector 12, the display controller 14 determines the information disposition and the display mode based on the information of the option data (hierarchies, the number of items, items, etc.) inputted from the data storage 13, and displays a screen formed of characters, images, video, a combination thereof and the like on the display portion 15. Details of the operation of the display controller 14 will be described later.

The display portion 15 is formed of a display device such as an LCD, and displays a screen to be displayed, under the control of the display controller 14.

In the information processing device 10 of the present embodiment structured as described above, when predetermined information stored (accumulated) in the data storage (database) 13 is searched for desired information, a plurality of options (option group) are displayed on the display portion 15 with search criteria prepared in the data storage 13 as options. When the user selects a specific option to provide an instruction to select a desired item and performs an input operation so as to move it to a preset selection area, the operation detector 12 detects the input operation, arithmetic processing described later is executed, and the search result is displayed.

Figure 2:
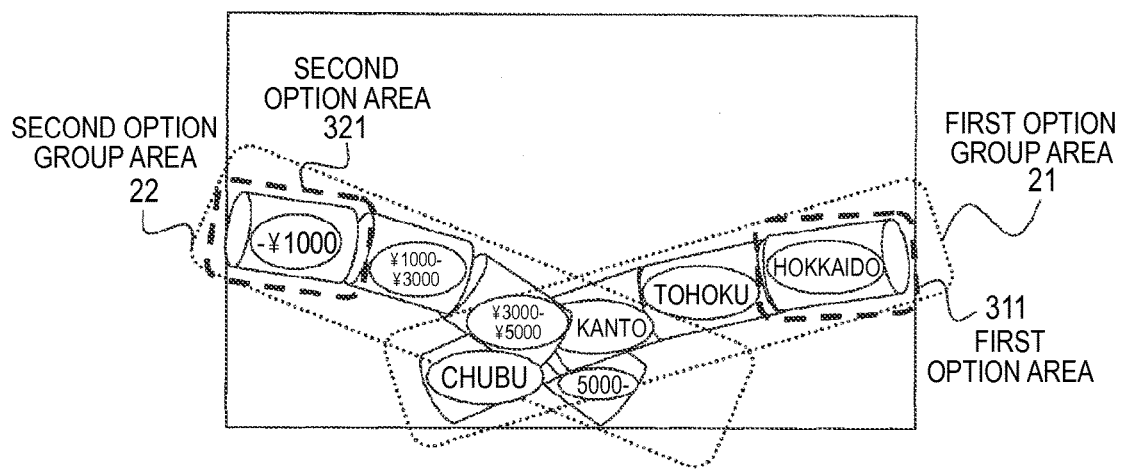
FIGS. 2(a) to 2(c) are views showing an example of the display region where options of search criteria are displayed in the first embodiment of the present invention.
Figure 2:
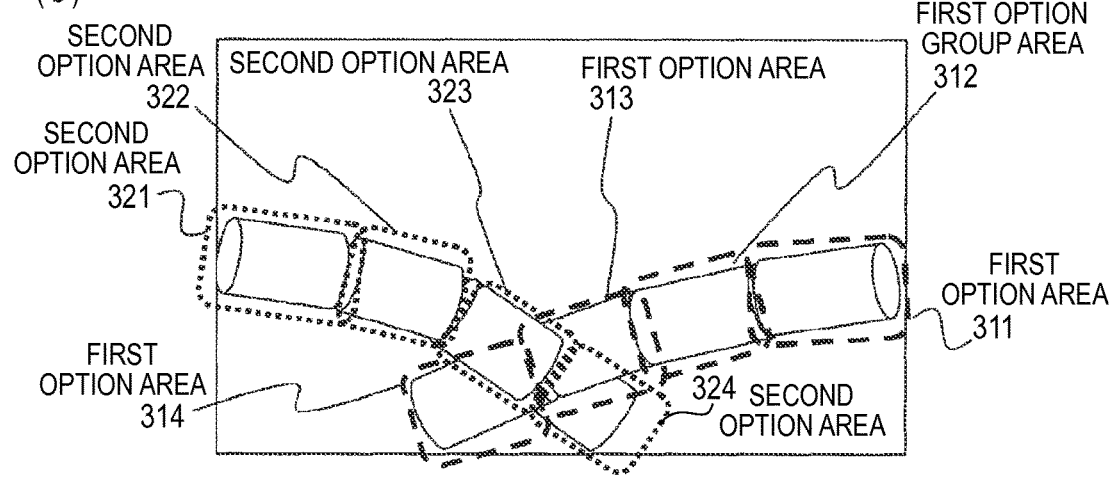
Figure 2:
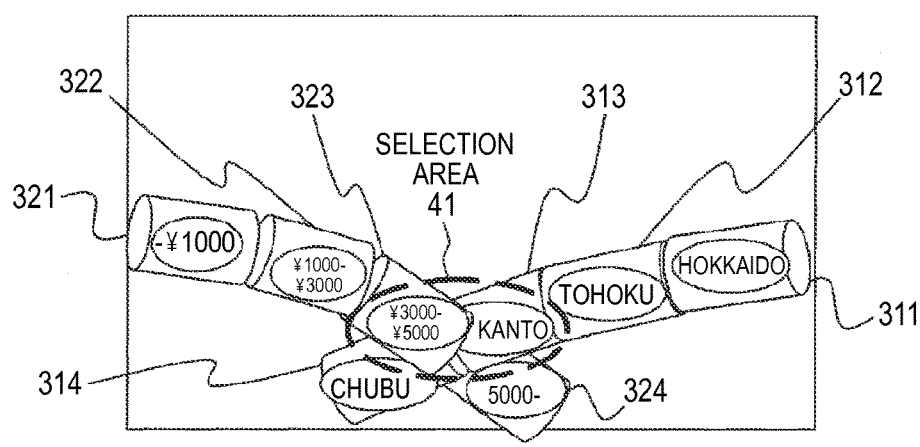

Next, using FIGS. 2(a) to 2(c), the display region will be described. The display region is a region where information including options of the first search criterion and options of the second search criterion is displayed on the display portion 15.

FIGS. 2(a) to 2(c) are views showing an example of the display region where options of the search criteria are displayed in the first embodiment of the present invention. FIG. 2(a) is a view showing an example of the disposition of option group areas and option areas in the display region, FIG. 2(b) is a view showing an example of the disposition of two different groups of option areas in the display region, and FIG. 2(c) is a view showing an example of the disposition of an selection area in the display region.

The examples shown in FIGS. 2(a) to 2(c) represent a screen including the display region when the user searches for a desired shop by using "district" indicating a geographical area and "price" as search criteria. An example of setting of the option group areas and the option areas in the display region will be shown below.

As shown in FIG. 2(a), when there is more than one option of the first search criterion, a region where the options are continuously displayed, for example, on a straight line or a curved line is set as a first option group area 21. Likewise, a region where the options of the second search criterion are continuously displayed, for example, on a straight line or a curved line in a region different from the first option group area 21 is set as a second option group area 22. In the illustrated example, the first option group area 21 and the second option group area 22 are each an arc-shaped representation.

As shown in FIG. 2(b), a plurality of options of the first search criterion displayed in the first option group area 21 are shown one in each of first option areas 311 to 314 as icons represented by, for example, pictures or pictorial symbols. Moreover, a plurality of options of the second search criterion displayed in the second option group area 22 are displayed one in each of second option areas 321 to 324 in a similar manner. In the illustrated example, the first option areas 311 to 314 and the second option areas 321 to 324 are each a representation of a cylindrical perspective image.

A selection area 41 is a given partial region in the display region that is preset as described below.

That is, when detecting that a given first option area and a given second option area are included in the selection area 41, the display controller 14 can shift to the following two kinds of processing.

One of the two kinds of processing is search processing for drawing a search result that satisfies the criterion shown by the given first option and the criterion shown by the given second option when it is detected that the given first option area and the given second option area are included in the selection area 41 and a predetermined condition (passage of time, etc.) is satisfied, and search result display processing.

The other one is processing for displaying, in the first option group area, (for example, lower hierarchy) options associated with the first option area displayed in the selection area 41 according to the user's operation.

In other words, the selection area 41 is an area that is set as a region for detection of the first option and the second option for causing the processing desired by the user to be executed.

Here, as the condition where "the option areas are included", it is desirable that the entire area of the given first option area and/or the given second option area is displayed in the selection area 41. However, according to the size of the option areas and the disposition of the option areas, the presence of given partial areas of the option areas in the selection area 41 may be detected to perform search processing. When the inclusion of given partial areas of the option areas is used as the selection area like this, for example, since the option areas can be set so as to be large, visibility is excellent for the user, so that operability can be improved. Alternatively, with respect to the disposition of a plurality of options, the degree of freedom of layout setting increases, so that the design property improves.

For the region of the selection area, the size thereof may be preset, or setting may be made so that the user can change the size as appropriate. When setting is made so that the user can change the size as appropriate like this, if the search criterion assigned to the options displayed in the second option group area is continuous (for example, a search criterion for which continuous numerical values are used such as a fare or a distance), the search criteria shown by two or more given second option areas can be used at a time, so that the resolution of the search criteria can be made rough and this can contribute to the enhancement of efficiency of the search work for the user such as a rough grasp of the search result.

An example of setting of the selection area in the display region will be shown below.

As shown in FIG. 2(c), a region including only the immediately preceding first option area 313 and the immediately preceding second option area 323 is set as the selection area 41 where options of the search criteria desired by the user is displayed. A region including only the first option areas 311 to 314 of a predetermined number and the second option areas 321 to 324 of a predetermined number may be set as the selection area 41 where options of the search criteria desired by the user is displayed.

Figure 3:
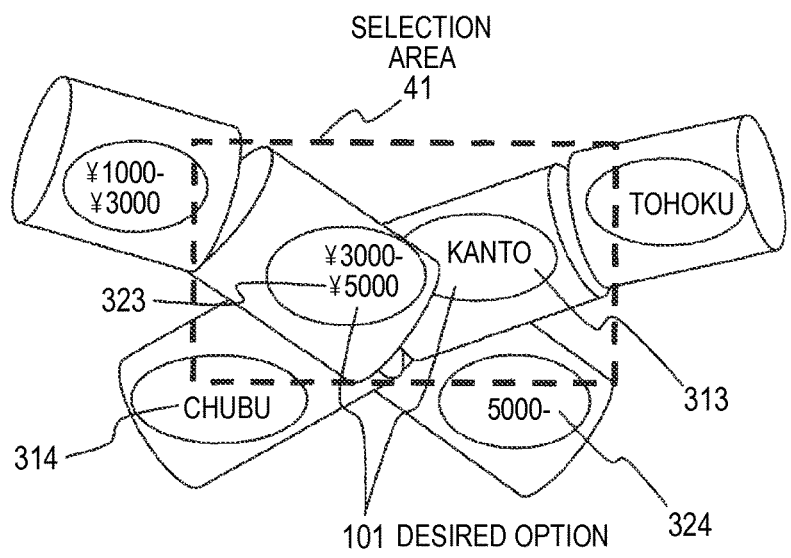
FIGS. 3(a) to 3(c) are views each showing an example of a selection area where options of the search criteria are displayed in the first embodiment of the present invention.
Figure 3:
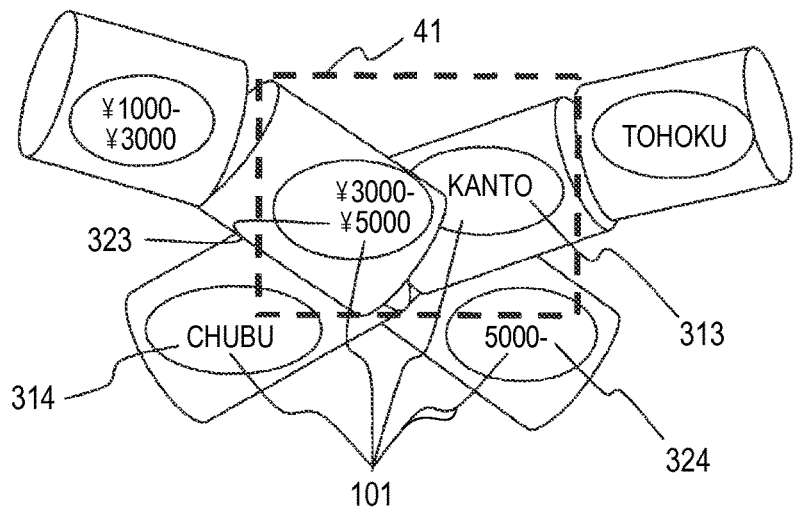
Figure 3:
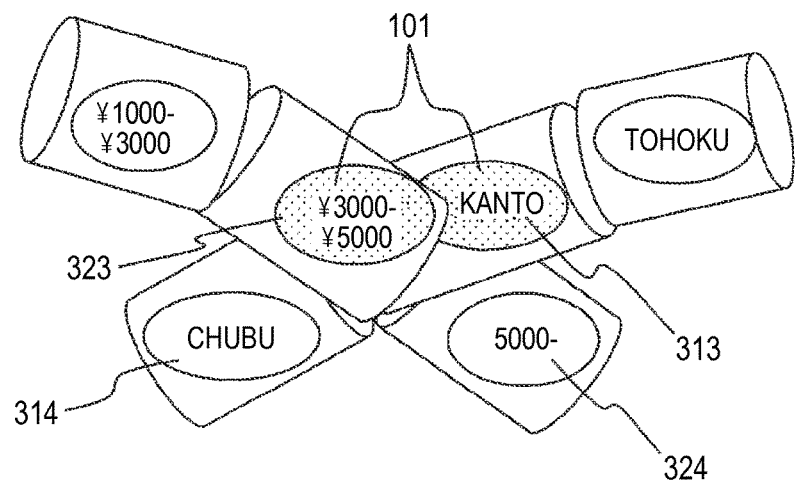

Further, using FIGS. 3(a) to 3(c), the options of the search criteria desired by the user and the selection area will be described in detail. FIGS. 3(a) to 3(c) are views each showing an example of the selection area where options of the search criteria are displayed in the first embodiment of the present invention. In FIGS. 3(a) to 3(c), the neighborhood of the selection area of the display region is enlarged, and an example of a condition where and the options desired by the user are disposed is shown. FIG. 3(a) is a view showing a display example where the display region of the first option area 313 or the second option area 323 is displayed so as to be all included in the selection area 41, FIG. 3(b) is a view showing a display example where the display regions of the first option areas 313 and 314 or the second option areas 323 and 324 are displayed so as to be partly included in the selection area 41, and FIG. 3(c) is a view showing a display example where no specific selection area 41 is provided.

When the inclusion of the entire area of an option area is used as shown in FIG. 3(a), the option in the first option area 313 or the second option area 323 the display region of which is all displayed in the selection area 41 is set as a user desired option 101. Moreover, when the inclusion of a partial area of an option area is used as shown in FIG. 3(b), the option in the first option area 314 or the second option area 324 the display region of which is partly included in the selection area 41 is set as a user desired option 101. Further, when no specific selection area 41 is provided as shown in FIG. 3(c), in the first option area 313 and the second option area 323, the region of overlap between these areas is regarded as the selection area. In this case, when the displays of the option of the first search criterion and the option of the second search criterion overlap each other, a search result that satisfies the criteria of the options displayed so as to overlap each other is displayed on the display portion 15 as the desired option 101 desired by the user.

In all the examples of FIGS. 3(a) to 3(c), in the display regions of the first option areas 311 to 314 or the second option areas 321 to 324, the display color of the desired option 101 desired by the user may be made different.

Figure 4:
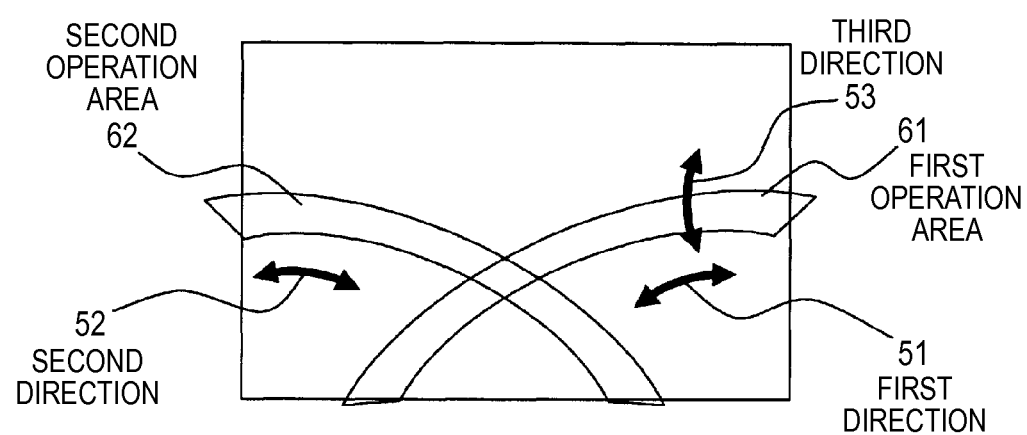
FIG. 4 is a view showing an example of operation regions for option groups where a plurality of options are displayed, and operation directions.

Using FIG. 4, operation regions and operation directions will be described. FIG. 4 is a view showing an example of the operation regions (operation areas) for option groups where a plurality of options are displayed, and the operation directions.

First, the operation regions will be described. The operation regions are regions where it is detected that the user has traced the operation portion 11 with a finger (has performed a slide operation) when options of the first search criterion and options of the second search criterion are displayed on the display portion 15. A region where options of the first search criterion displayed in the first option group area 21 are operated is set as a first operation area 61. A region where options of the second search criterion displayed in the second option group area 22 are operated is set as a second operation area 62. The operation detector 12 detects a slide operation by the user and the operation direction of the slide operation in these first operation area 61 and second operation area 62.

Next, the operation directions will be described. In the first operation area 61, a direction substantially along or substantially parallel to the row (disposition) of a plurality of options of the first search criterion is set as a first direction 51, and in the second operation area 62, a direction substantially along or substantially parallel to the row (disposition) of a plurality of options of the second search criterion is set as a second direction 52. Moreover, in the first operation area 61, a direction substantially vertical to the first direction is set as a third direction 53.

While in FIG. 4, the third direction 53 is shown as a direction approximately 90 degrees different from the first direction 51, the present invention is not limited thereto. The third direction 53 may be set to any direction in which the operation is easily performed with the finger performing the operation in the first direction as long as the first direction 51 and the third direction 53 are not misdetected and two operation directions can be detected separately according to the resolution of the device used as the operation detector 12.

Further, the processing of the display screen based on the operation direction in the operation region will be described.

When the operation detector 12 detects that the first operation area 61 has been operated in the first direction 51 shown in FIG. 4, the display controller 14 moves the positions of the options of the first search criterion according to the operation, and periodically displays other options in succession. Moreover, when the operation detector 12 detects that the second operation area 62 has been operated in the second direction 52 shown in FIG. 4, the display controller 14 moves the positions of the options of the second search criterion according to the operation, and periodically displays other options in succession. In the illustrated example, for both the first search criterion and the second search criterion, options are displayed so as to be rotated in correspondence with the arc-shaped operation group areas and operation areas.

The user operates the first operation area 61 in one direction of the first direction 51 shown in FIG. 4 and when the beginning or the tail end of the option list is displayed in the first option group area 21, the display controller 14 may allow the option display to move to the selection area 41 and disallow the option display to be updated even if a further operation in the direction is detected. Moreover, the user operates the second operation area 62 in one direction of the second direction 52 shown in FIG. 4 and when the beginning or the tail end of the option list is displayed similarly in the second option group area 22, the display controller 14 may allow the option display to move to the selection area 41 and disallow the option display to be updated even if a further operation in the direction is detected.

At this time, according to the operation amount, display is provided while the rotary scroll amounts of the first option areas 311 to 314 are changed in correspondence with the arc-shaped first option group area 21 and first operation area 61. The first option areas may be displayed so as to move one by one irrespective of the operation amount. The same applies to the second option group area 22.

Further, when the operation detector 12 detects that the first operation area 61 has been operated in the third direction 53 shown in FIG. 4, according to the operation, the display controller 14 displays, in the first option group area 21, options of the upper hierarchy or lower hierarchy of the option displayed in the first option area 313 that is present in the selection area 41.

Figure 5:
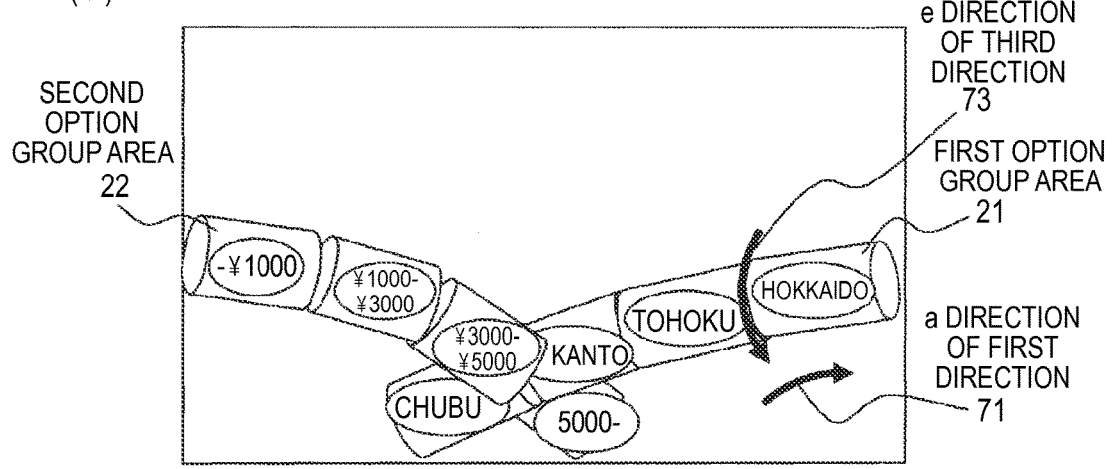
FIGS. 5(a) to 5(c) are views showing an example of the display of options of the search criteria in accordance with the operation condition.
Figure 5:
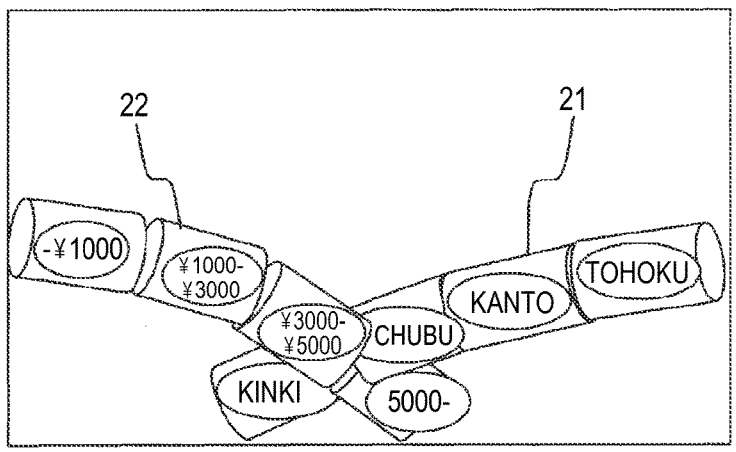
Figure 5:
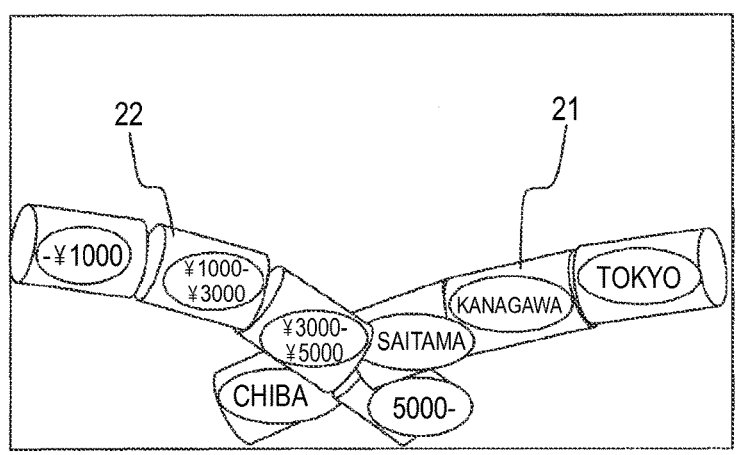
Figure 6:
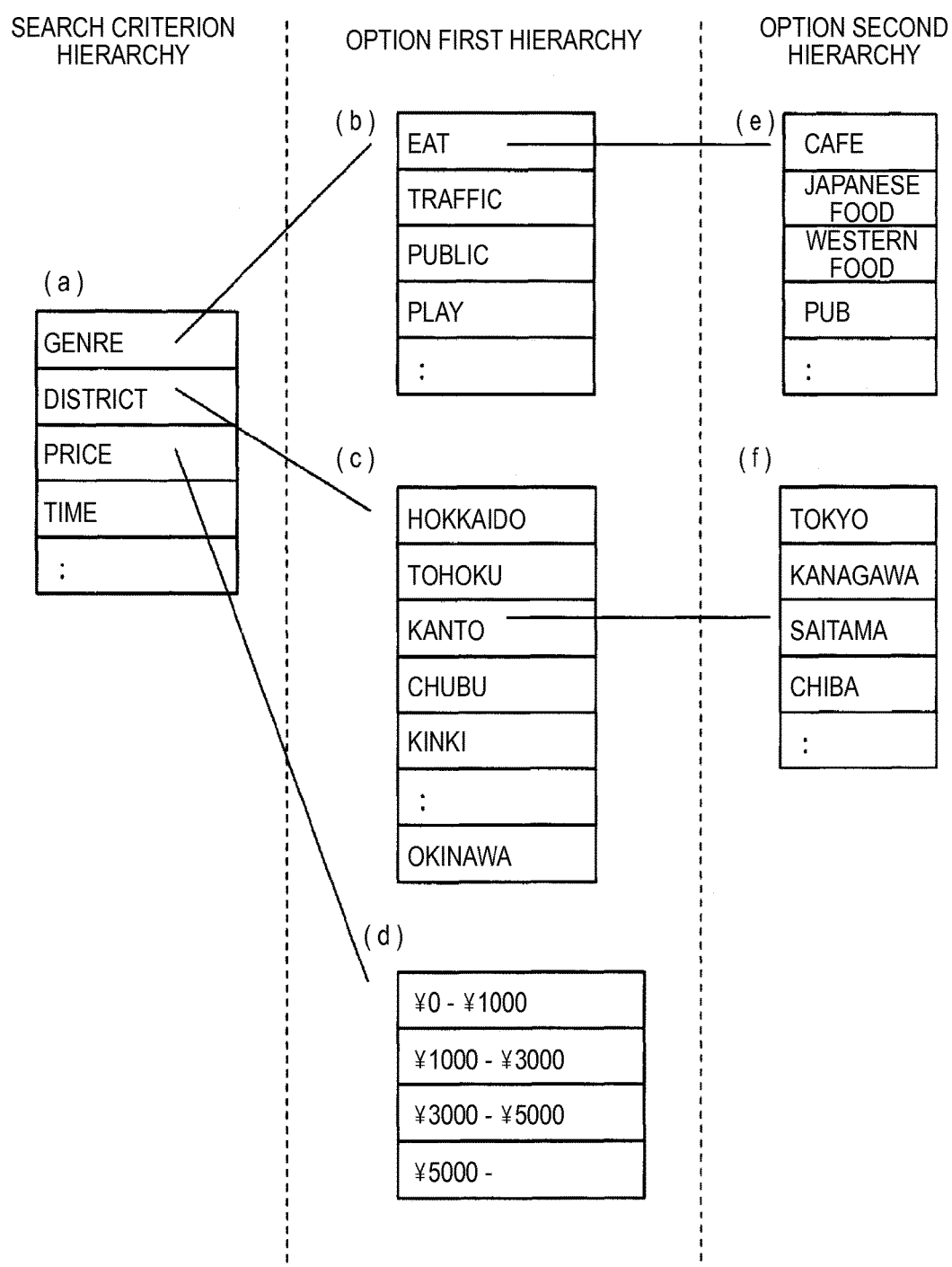
FIGS. 6(a) to 6(f) are views showing an example of option data having a hierarchical structure.

Using FIGS. 5(a) to 5(c), the display of options updated by an operation will be described. FIGS. 5(a) to 5(c) are views showing an example of the display of options of the search criteria in accordance with the operation condition. FIG. 5(a) is a view showing the condition before an operation, FIG. 5(b) is a view showing the condition where an operation is performed in an a direction of the first direction, and FIG. 5(c) is a view showing the condition where an operation is performed in an e direction of the third direction. Here, the option data having a hierarchical structure will be described first by using FIGS. 6(a) to 6(f).

FIGS. 6(a) to 6(f) are views showing an example of the option data stored in the data storage 13 and managed on a hierarchy-by-hierarchy basis. In the figure, as the search criterion hierarchy in a facility search, items such as "genre", "district", "price" and "time" are shown in FIG. 6(a). As the option first hierarchy of the item "genre", options such as "eat" and "traffic" are shown in FIG. 6(b). Moreover, as the option first hierarchy of the item "district", options such as "Hokkaido", "Tohoku" and "Kanto" are shown in FIG. 6(c). Moreover, as the option first hierarchy of the item "price", options such as "less than ¥1000", "not less than ¥1000 to less than ¥3000" and "not less than ¥3000 to less than ¥5000" are shown in FIG. 6(d). Further, as the option second hierarchy of the option "eat", options such as "cafe", "Japanese food" and "Western food" are shown in FIG. 6(e). Moreover, as the option second hierarchy of the option "Kanto", options such as "Tokyo", "Kanagawa" and "Saitama" are shown in FIG. 6(f).

While in FIG. 6(e), the above-mentioned options are shown as the option second hierarchy of the option "eat" with kinds of foods as examples, it is necessary only that it be information related to the option "eat"; for example, it may be "well-established restaurant", "for party" and the like. Likewise, while in FIG. 6(c), the above-mentioned options are shown as the option first hierarchy of the option "district" with district names as examples, it is necessary only that it be information related to the option "district"; for example, it may be "distance from the present location" and the like. Next, the description of FIGS. 5(a) to 5(c) will be resumed.

In FIG. 5(a), as the screen before an operation, options "Hokkaido", "Tohoku", "Kanto" and "Chubu" of the option first hierarchy of the item "district" are displayed in the display region of the first search criterion, and options "¥1000", "¥1000-¥3000", "¥3000-¥5000" and "¥5000-" of the option first hierarchy of the item "price" are displayed in the display region of the second search criterion.

First, when the operation detector 12 detects that the first option group area 21 has been operated in the a direction 71 of the first direction 51 shown in FIG. 5(a), the display controller 14 reads the option data list of the first hierarchy of the item "district" of the first search criterion from the data storage 13, and updates the display in the first option group area 21 to "Tohoku", "Kanto", "Chubu" and "Kinki" in the a direction 71 of the first direction 51 as shown in FIG. 5(b). When it is detected that the first option group area 21 has been operated in a direction opposite to the a direction 71 of the first direction 51 shown in FIG. 5(a), the display in the first option group area 21 is updated to "Okinawa", "Hokkaido", "Tohoku" and "Kanto" in the direction opposite to the a direction 71 of the first direction 51. Likewise, in the display region of the second search criterion, when the operation detector 12 detects that the second option group area 22 has been operated in one direction of the second direction 52 (FIG. 4), the display controller 14 reads the option data list of the first hierarchy of the item "price" of the second search criterion from the data storage 13, and updates the display in the second option group area 22.

Moreover, when the operation detector 12 detects that the first option group area 21 has been operated in an e direction 73 of the third direction 53 shown in FIG. 5(a), the display controller 14 reads, from the data storage 13, the option data list of the lower hierarchy of the option "Kanto" of the first search criterion displayed in the option area of FIG. 5(a) before the operation, and updates the display in the first option group area 21 to "Tokyo", "Kanagawa", "Saitama" and "Chiba" as shown in FIG. 5(c). When it is detected that the first option group area 21 has been operated in a direction opposite to the e direction 73 of the third direction 53 shown in FIG. 5(a), the display controller 14 reads, from the data storage 13, the option data list of the upper hierarchy of the option "Kanto" of the first search criterion displayed in the option area of FIG. 5(a) before the operation, and updates the display in the first option group area 21 to "genre", "district", "price" and "time".

Figure 7:
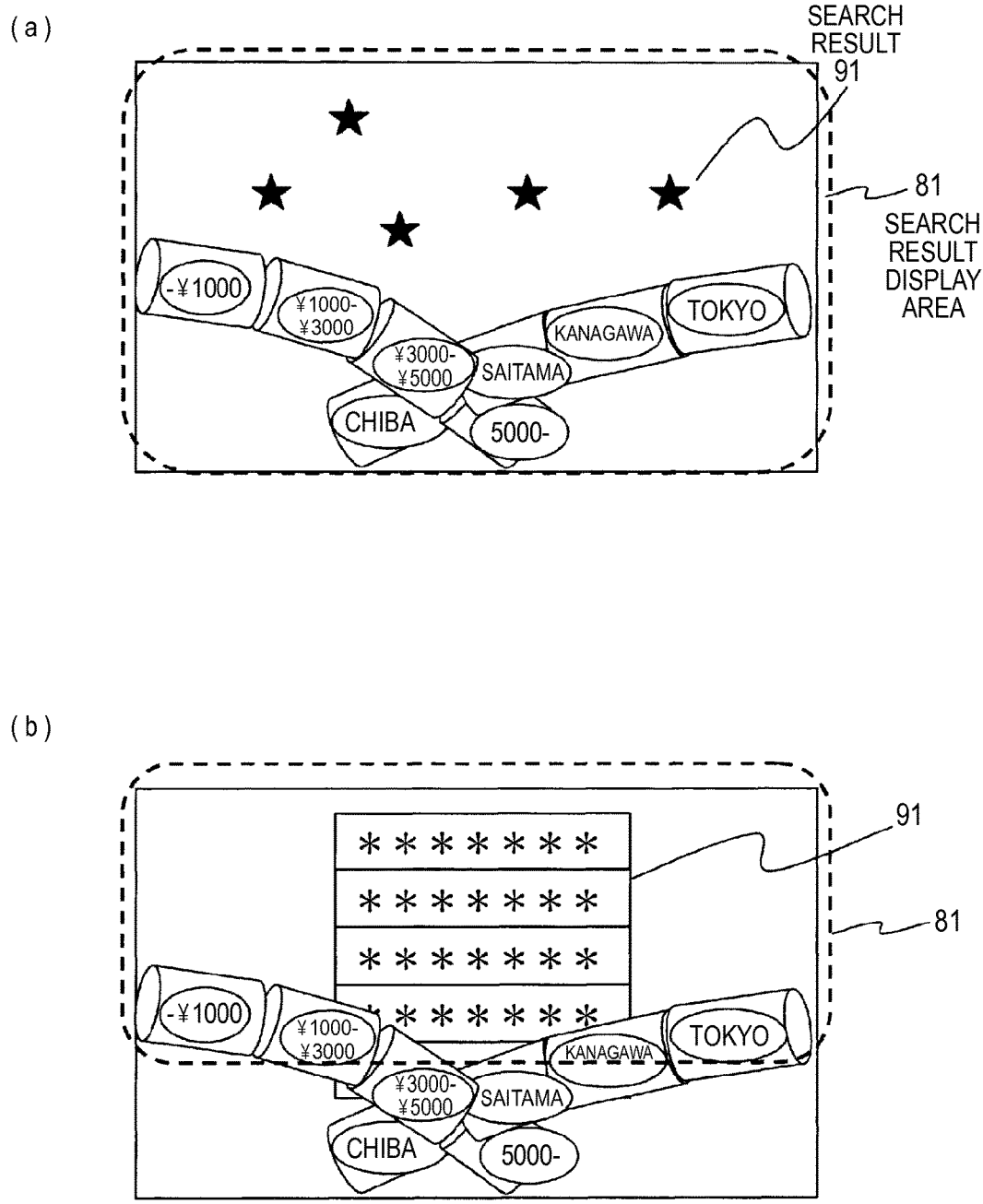
FIGS. 7(a) and 7(b) are views showing examples of the search result display.

FIGS. 7(a) and 7(b) are views showing examples of the search result display. FIG. 7(a) is a view showing an example in which search results 91 are displayed as icons on a map, and FIG. 7(b) is a view showing an example in which the search results 91 are displayed in a list form.

When the user does not perform an operation for a predetermined period of time while displaying options of the search criteria as shown in FIG. 2(c), the display controller 14 determines that the option selection operation has been completed, and displays the search results corresponding to the criteria of the options.

In this case, when the operation detector 12 does not detect an operation for a predetermined period of time, the display controller 14 displays, in a search result display area 81 shown in FIGS. 7(a) and 7(b), the search results 91 satisfying the criteria of the options of the first option areas 313 of a predetermined number and the second option areas 323 of a predetermined number included in the selection area 41 shown in FIG. 2(c).

With respect to the information processing device 10 structured as described above, the processing operation thereof will be described below.

Figure 8:
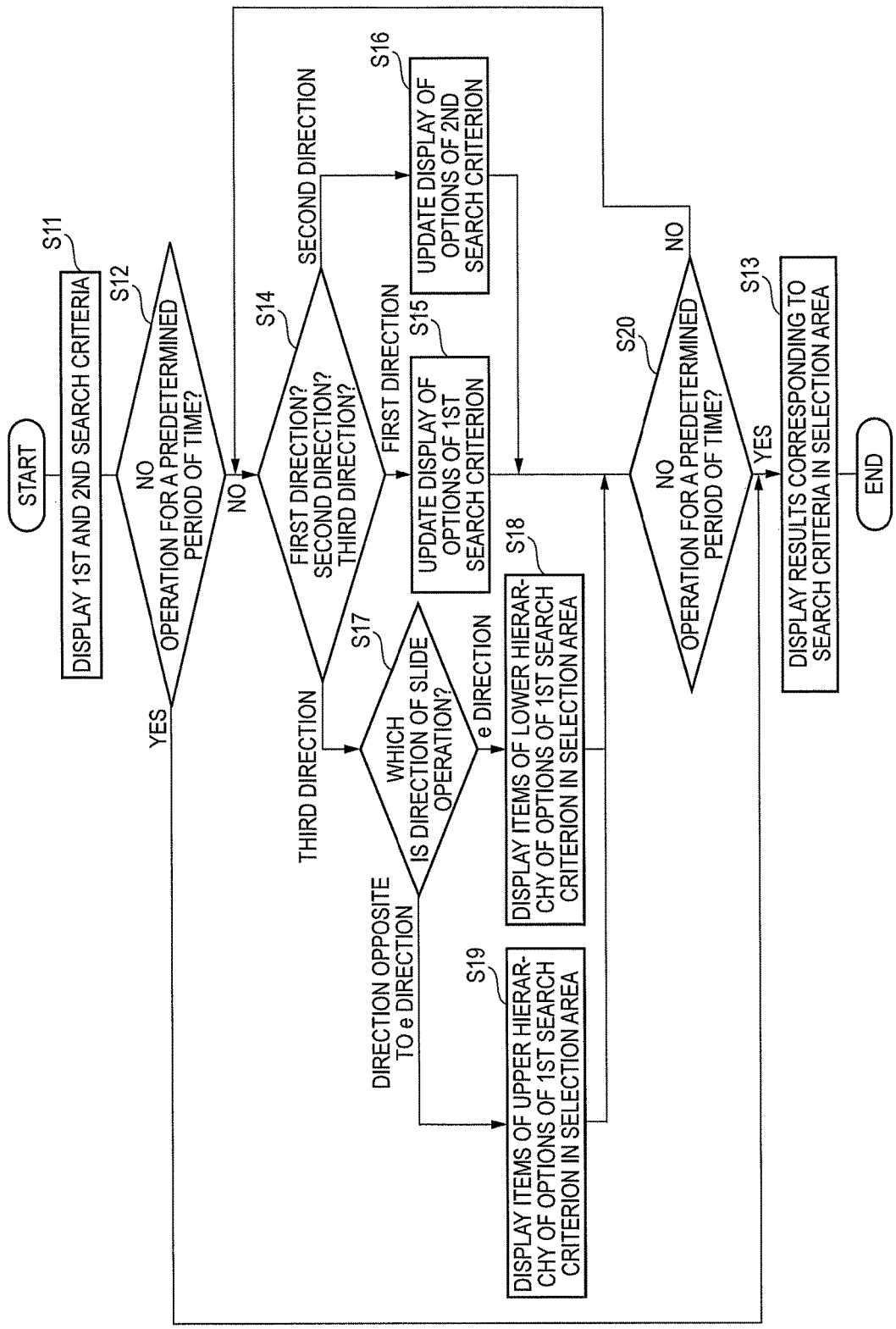
FIG. 8 is a flowchart for explaining the operation of a display controller in the first embodiment of the present invention.

FIG. 8 is a flowchart showing the operation procedure of the display controller 14 of the information search of the information processing device 10 in the first embodiment of the present invention. In the following description of the flowchart shown in FIG. 8, to explain a concrete example, FIGS. 1 to 7 will be referred to when needed.

First, the operation portion 11 of the information processing device 10 is operated by the user, and the operation detector 12 detects that the information search processing has been called. The call for the information search processing may be a depression of a hardkey provided on the housing of the information processing device 10 or a softkey provided on the display portion 15. Moreover, performing a predetermined gesture on the display screen of the display portion 15 may be the call for the information search function.

When it is detected that the search processing was called, as shown in FIGS. 6(a) to 6(f), the display controller 14 displays a predetermined number of options so that the options of the first hierarchy of the first item "district" of the search criterion outputted from the data storage 13 are in the first option group area 21 and that the options of the first hierarchy of the second item "price" of the search criterion are in the second option group area 22 (step S11). Here, the options of the first hierarchy of the item "district" (district names shown in FIG. 6(c) as examples) are disposed in the first option areas 311 to 314 in order and the options of the first hierarchy of the item "price" (price categories shown in FIG. 6(d) as examples) are disposed in the second option areas 321 to 324 in order.

When no operation is performed by the user for a predetermined period of time (step S12, Yes), the display controller 14 determines that the option selection operation has been completed based on the undetection of an operation for the predetermined period of time by the operation detector 12. Then, the display controller 14 displays on the display portion 15 the search results satisfying the criteria of a predetermined number of options of the first search criterion and a predetermined number of options of the second search criterion included in the selection area 41 (step S13).

When an operation is performed by the user (step S12, No), as the detection of the operation direction, the operation detector 12 determines whether the operation direction is the first direction 51, the second direction 52 or the third direction 53 (step S14). When the operation detector 12 detects the first direction (step S14, first direction), the display controller 14 updates the display of options of the first search criterion according to the operation amount (step S15). When the operation detector 12 detects the second direction (step S14, second direction), the display controller 14 updates the display of options of the second search criterion according to the operation amount (step S16). When the operation detector 12 detects the e direction 73 of the third direction (step S17, e direction), the display controller 14 displays in the first option group area 21 options of the lower hierarchy of the options of the first search criterion that are present in the neighborhood of the selection area 41 (step S18). When the operation detector 12 detects a direction opposite to the e direction 73 of the third direction (step S17, opposite direction), the display controller 14 displays in the first option group area 21 the options of the upper hierarchy of the options of the first search criterion that are present in the neighborhood of the selection area 41 (step S19).

Lastly, when no operation is performed by the user for the predetermined period of time (step S20, Yes), the display controller 14 determines that the option selection operation has been completed based on the undetection of an operation for the predetermined period of time by the operation detector 12. Then, the display controller 14 ends this display control, and displays the search results satisfying the criteria of a plurality of number of options of the first search criterion and a plurality of options of the second search criterion included in the selection area 41, in an area other than the operation region of the display portion 15 (step S13). The operations of ending the option selection and ending the search may be a depression of a hardkey provided on the housing of the information processing device 10 or may be a softkey provided on the display portion 15. Moreover, performing a predetermined gesture such as a tap operation onto a predetermined area on the operation portion 11 may be the call for the processing of ending the option selection and ending the information search function.

As described above, according to the present embodiment, by providing the operation detector 12 that detects a slide operation in the first, second and third directions in the operation area, the display controller 14 that changes the information that the own device displays in the first and second option group areas 21 and 22 according to the result of the detection by the operation detector 12 and the selection area 41 including a predetermined number of first and second option areas 311 to 314 and 321 to 324, a search operation using the hierarchically structured first search criterion and the second search criterion different from the search criterion can be easily selected on one screen.

(Modifications)

Figure 9:
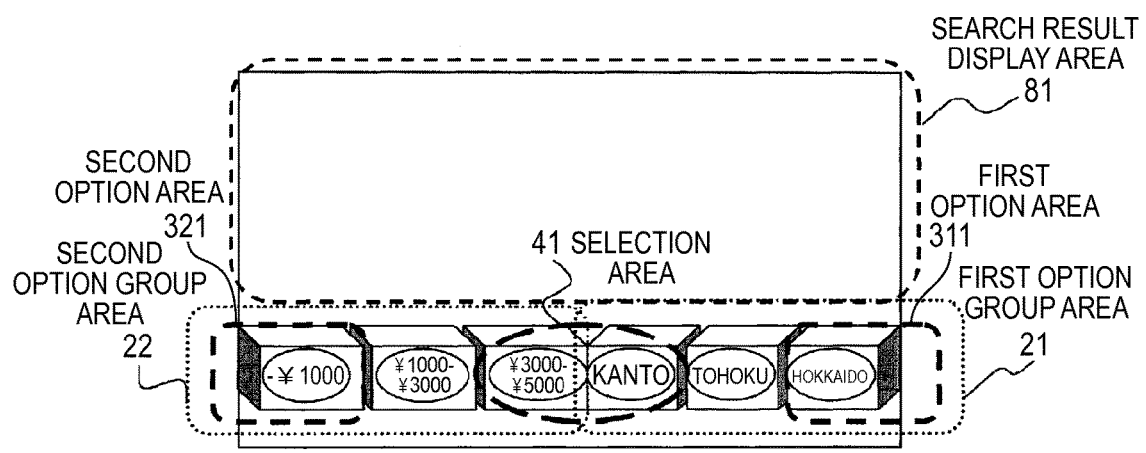
FIG. 9 is a view showing an example of the option display region according to a first modification of the first embodiment of the present invention.

FIG. 9 is a view showing an example of the display region of the information processing device 10 in a first modification of the first embodiment of the present invention.

In the modifications of the first embodiment, structures similar to those of the first embodiment are denoted by the same reference numerals and signs, and detailed descriptions thereof are omitted.

In the first modification, the first option group area 21 and the second option group area 22 have a shape that is not arc-shaped, and are disposed on the lower right and left sides of the present device. In the illustrated example, the first option group area 21 and the second option group area 22 are each a substantially linear representation.

With this, a wide search result display area 81 can be obtained.

Figure 10:
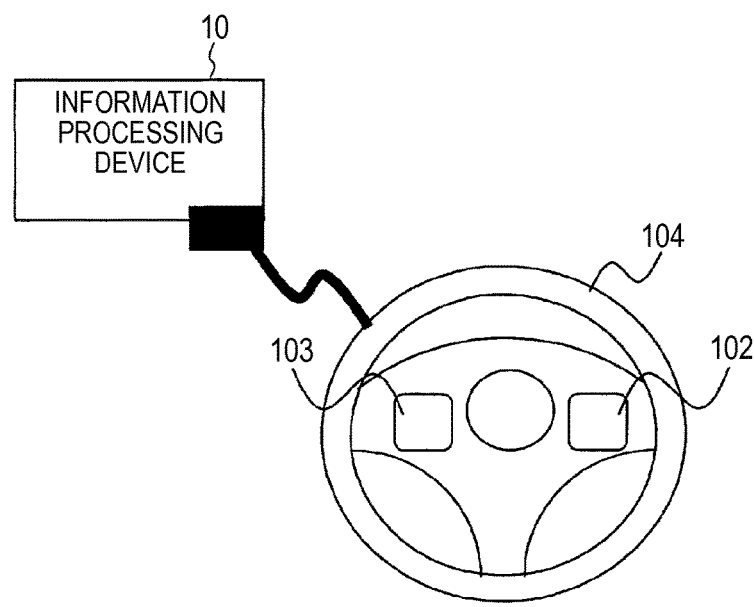
FIG. 10 is a view showing an example of the arrangement structure of the information processing device 10 according to a second modification of the first embodiment of the present invention.

FIG. 10 is a view showing an example of the arrangement structure of the information processing device 10 as a second modification. The second modification is a structure example in which the information processing device 10 is mounted on an onboard apparatus.

In the second modification, the operation portion 11 is not a touch panel, but a switch, a touch pad or the like attached to the neighborhood of the steering of a vehicle is used. Like an example thereof shown in FIG. 10, a steering device 104 is provided with operation touch pads 102 and 103 as the operation portion 11, and a non-illustrated operation detector 12 is provided in the neighborhood of the operation touch pads 102 and 103. With this, a selection operation of a search operation using a hierarchically structured search criterion and a search criterion different from the search criterion can be easily performed on one screen without taking an unnatural posture such as reaching out a hand from the driver's seat.

Moreover, the information processing device 10 of the present embodiment may be placed in a vehicle by using a connection unit such as a cradle and be coupled via a connector to an operation portion such as a switch, a touch pad or the like attached to the neighborhood of the steering of the vehicle to thereby enable operation. With this, in walking, the information processing device 10 detached from the vehicle can be operated with a finger while being held with a hand, and when mounted on the vehicle, the information processing device 10 can be operated with the operation portion in the neighborhood of the steering that is at a distance therefrom.

As a third modification, the display region and the operation region may be different regions. While in the above-described first embodiment, the first option group area 21 which is the display region of the first search criterion and the first operation area 61 which is the operation region of the first search criterion, or the second option group area 22 which is the display region of the second search criterion and the second operation area 62 which is the operation region of the second search criterion are each shown as coinciding regions, the present invention is not limited thereto. By making the display region and the operation region different regions, operation can be performed without an option being hidden by the finger with which operation is performed.

Figure 11:
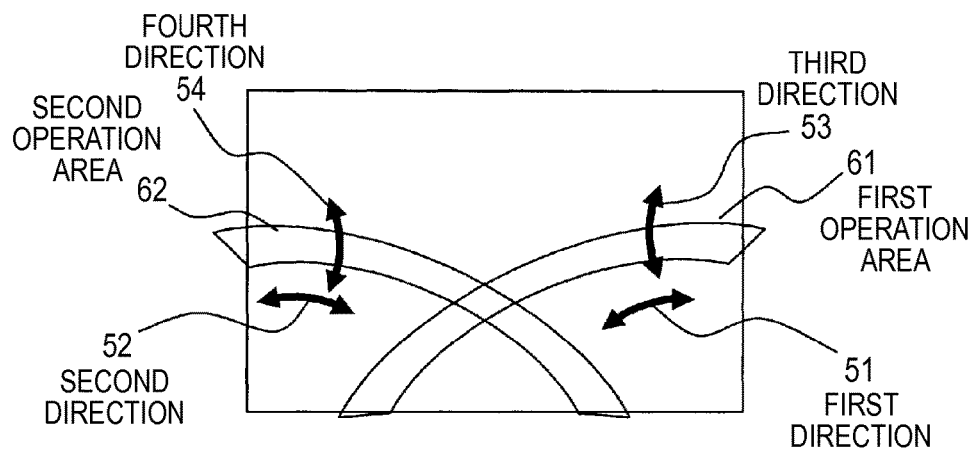
FIG. 11 is a view showing an example of operation directions according to a fourth modification of the first embodiment of the present invention.

FIG. 11 is a view showing an example of the operation directions as a fourth modification.

The fourth modification is an example in which hierarchical options are also provided for the second search criterion. In this case, as an operation direction to switch the display of the hierarchical options of the second search criterion, a fourth direction 54 different from the second direction 52 is provided. While the fourth direction 54 is shown as a direction approximately 90 degrees different from the second direction 52 in FIG. 11, the present invention is not limited thereto. The fourth direction 54 is a direction where the detection of the second direction 52 and the fourth direction 54 is not erroneously performed and in which the operation is easily performed with the finger performing the operation in the second direction 52 according to the resolution of the device used as the operation detector 12.

With this, a search operation using data where both the first search criterion and the second search criterion have a hierarchical structure can be easily selected on one screen.

Figure 12:
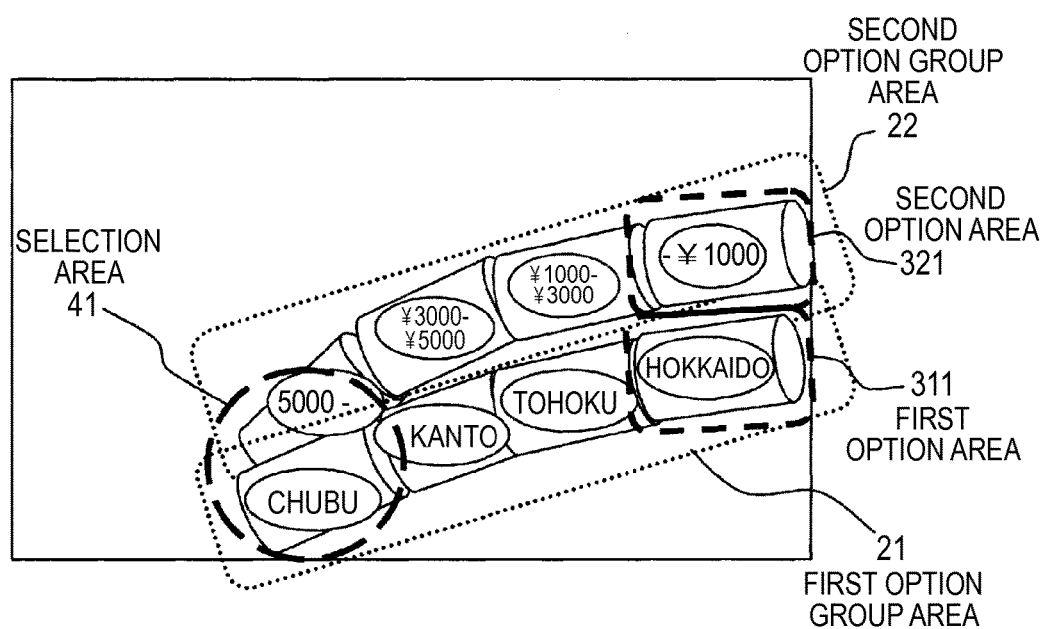
FIG. 12 is a view showing an example of the option display region according to a fifth modification of the first embodiment of the present invention.

FIG. 12 is a view showing an example of the display region of the information processing device 10 as a fifth modification.

As shown in FIG. 12, the fifth modification is to dispose the first option group area 21 and the second option group area 22 substantially in parallel to each other on either the right or the left side of the display screen of the display portion 15.

With this, the operation in the first, second and third directions can be performed with one hand.

Figure 13:
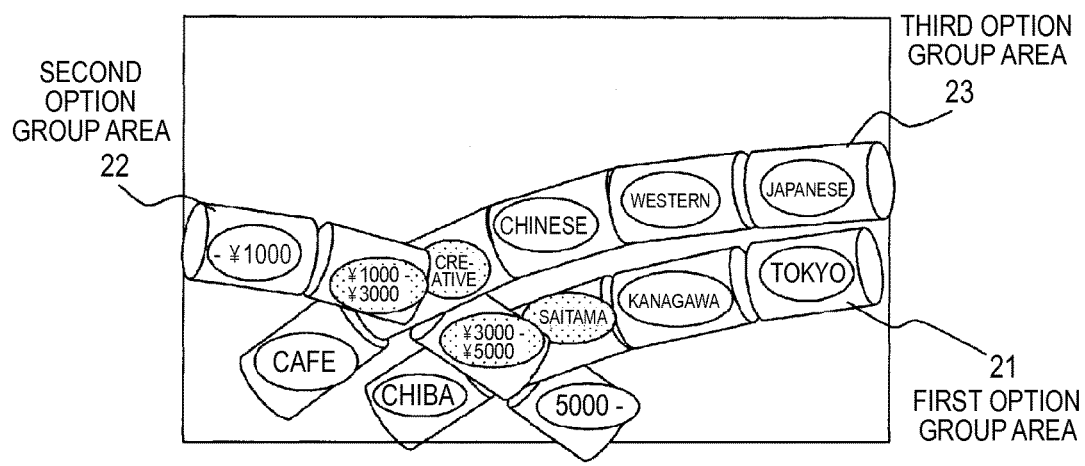
FIG. 13 is a view showing an example of the option display region according to a sixth modification of the first embodiment of the present invention.

FIG. 13 is a view showing an example of the display region of the information processing device 10 as a sixth modification. The sixth modification is an example in which more than two search criteria are displayed as a plurality of search criteria.

FIG. 13 shows an example of a display region where the first option group area 21, the second option group area 22 and a third option group area 23 which are three search criteria are displayed. Here, it is assumed that as the first search criterion, for example, the second hierarchy of "district" (prefecture names shown in FIG. 6(f) as examples) is used, as the second search criterion, for example, the first hierarchy of "price" (price categories shown in FIG. 6(d) as examples) is used and as the third search criterion, for example, the second hierarchy of "genre" (restaurant types shown in FIG. 6(e) as examples) is used.

When the option displays of the option "Saitama" of the first search criterion and the option "¥3000-¥5000" of the second search criterion, and the option displays of the option "creative cuisine" of the third criterion and the option "¥1000-¥3000" of the second search criterion overlap as shown in FIG. 13, as the options desired by the user, the search results satisfying the criteria of the options displayed so as to overlap are displayed on the display portion 15. In this case, as the results satisfying the criteria, results which are the logical sum of the results satisfying the criteria "Saitama" and "¥3000-¥5000" and the results satisfying the criteria "creative cuisine" and "¥1000-¥3000" are displayed. Alternatively, results which are the logical product of the results satisfying the criteria "Saitama" and "¥3000-¥5000" and the results satisfying the criteria "creative cuisine" and "¥1000-¥3000" may be displayed. Alternatively, the search results may be displayed by using either one of the position overlapping with the option of the first search criterion and the position overlapping with the option of the third criterion as the option of the second search criterion. How to select the results satisfying the search criteria may be predetermined in the information processing device 10, or may be set by the user.

With this, search results which are a combination of options of three or more search criteria can be obtained, and how to combine these options can be selected. Moreover, as the form of display of a plurality of search criteria, not only a plurality of option groups of items of different kinds are displayed simultaneously as in the illustrated example but also option groups of different hierarchies of the same kind may be displayed simultaneously.

In the present embodiment, the first option group area 21 and the second option group area 22 may be displayed in semi-transparent state. By doing this, when the first option group area 21 and the second option group area 22 overlap each other, the options in the overlapping area is easy to view.

While in showing the search results, the selection operation is ended and the search results are displayed when no operation is performed for a predetermined period of time in the present embodiment, a hardkey or a softkey to cause the results to be displayed may be provided to execute processing.

Further, in the present embodiment, to switch the items of the search criteria to different criteria, processing may be executed by a depression of a hardkey provided on the housing of the information processing device 10 or a softkey provided on the display portion 15. Moreover, the items of the search criteria may be switched to different criteria by performing a predetermined gesture on the display screen of the display portion 15.

It is to be noted that various modifications and applications of the present invention made by one of ordinary skill in the art based on the description of the specification and known technologies without departing from the gist and scope of the present invention are intended by the present invention and included in the range of protection. Moreover, the components in the above-described embodiments may be arbitrarily combined without departing from the gist of the invention.

The present application is based upon Japanese Patent Application (No. 2011-263959) filed on Dec. 1, 2011, the entire contents of which are incorporated herein by reference.

INDUSTRIAL APPLICABILITY

The information processing device of the present invention is useful as an information processing device with which a search operation using a hierarchically structured search criterion and a search criterion different from the search criterion can be easily selected on one screen.

DESCRIPTION OF REFERENCE NUMERALS AND SIGNS

10 Information processing device
11 Operation portion
12 Operation detector
13 Data storage
14 Display controller
15 Display portion
21 First option group area
22 Second option group area
23 Third option group area
311 to 314 First option area
321 to 324 Second option area
41 Selection area
51 First direction
52 Second direction
53 Third direction
54 Fourth direction
61 First operation area
62 Second operation area
71 a direction of the first direction 51
73 e direction of the third direction 53
81 Search result display area
91 Search result
101 Desired option
102, 103 Touch pad
104 Steering device

The invention claimed is:

1. An information processing device comprising:
an operation detector that detects a slide operation in an operation area; and
a display controller that changes information that the information processing device displays in a display area according to a result of the detection by the operation detector,
wherein the display area includes:
a first option group area having a plurality of first option areas for selecting options;
a second option group area having a plurality of first option areas for selecting options; and
a selection area which is a region where at least part of the first option group area overlaps in a common visual layer with at least part of the second option group area such that the selection area only includes a predetermined number of the first option areas and a predetermined number of the second option areas,
wherein the predetermined number of the first option areas included in the selection area indicate a first search criteria, and the predetermined number of the second option areas included in the selection area indicate a second search criteria,
wherein the operation detector detects, as an operation direction of the slide operation, a first direction which is a direction in which the first option group area is operated, a second direction which is a direction in which the second option group area is operated, and a third direction which is a direction different from the first direction in which the first option group area is operated,
wherein when the operation detector detects that the slide operation is performed in the third direction, the display controller displays a third search criterion in the first option group area, the third search criterion being an option of an upper hierarchy or a lower hierarchy of an option of the first search criterion indicated by the predetermined number of the first option areas included in the selection area before the slide operation is performed in the third direction,
wherein the third search criterion is displayed in the first option group area so that the predetermined number of the first option areas included in the selection area indicate the third search criterion after the slide operation is performed in the third direction,
wherein the display controller displays a search result retrieved based on (i) the third search criterion indicated by the predetermined number of the first option areas included in the selection area and (ii) the second search criterion indicated by the predetermined number of the second option areas included in the selection area,
wherein the first option group area and the second option group area are arc-shaped, and
wherein the display controller displays the search result in a search result display area that does not include the selection area.

2. The information processing device according to claim 1, wherein the first direction corresponds to a direction of disposition of the first option areas, and the second direction corresponds to a direction of disposition of the second option areas.

3. The information processing device according to claim 1, wherein, in the selection area, at least a part of the predetermined number of the first option areas coincides with at least a part of the predetermined number of the second option areas.

4. A method of providing search criteria for a database search on an information processing device, the method comprising:
   detecting a slide operation in an operation area of a display device of the information processing device; and
   changing information displayed in a display area of the display device according to a result of the detected slide operation,
   wherein the display area includes:
      a first option group area having a plurality of first option areas for selecting options;
      a second option group area having a plurality of first option areas for selecting options; and
      a selection area which is a region where at least part of the first option group area overlaps in a common visual layer with at least part of the second option group area such that the selection area only includes a predetermined number of the first option areas and a predetermined number of the second option areas,
   wherein the predetermined number of the first option areas included in the selection area indicate a first search criteria, and the predetermined number of the second option areas included in the selection area indicate a second search criteria,
   wherein the method further comprises:
      detecting, as an operation direction of the detected slide operation, a first direction in which the first option group area is to be operated, a second direction in which the second option group area is to be operated, and a third direction different from the first direction in which the first option group area is operated;
      when detecting that the slide operation is performed in the third direction, displaying a third search criterion in the first option group area, the third search criterion being an option of an upper hierarchy or a lower hierarchy of an option of the first search criterion indicated by the predetermined number of the first option areas included in the selection area before the slide operation is performed in the third direction, and the third search criterion being displayed in the first option group area so that the predetermined number of the first option areas included in the selection area indicate the third search criterion after the slide operation is performed in the third direction;
      displaying a search result retrieved based on (i) the third search criterion indicated by the predetermined number of the first option areas included in the selection area and (ii) the second search criterion indicated by the predetermined number of the second option areas included in the selection area,
   wherein the first option group area and the second option group area are arc-shaped, and wherein the search result is displayed in a search result display area that does not include the selection area.

5. A non-transitory computer readable medium containing program instructions for causing a computer to perform a method of providing search criteria for a database search on an information processing device, the method comprising:
   detecting a slide operation in an operation area of a display device of the information processing device; and
   changing information displayed in a display area of the display device according to a result of the detected slide operation,
   wherein the display area includes:
      a first option group area having a plurality of first option areas for selecting options;
      a second option group area having a plurality of second option areas for selecting options;
      a selection area which is a region where at least part of the first option group area overlaps in a common visual layer with at least part of the second option group area such that the selection area only includes a predetermined number of the first option areas and a predetermined number of the second option areas,
   wherein the predetermined number of the first option areas included in the selection area indicate a first search criteria, and the predetermined number of the second option areas included in the selection area indicate a second search criteria,
   wherein the method further comprises:
      detecting, as an operation direction of the detected slide operation, a first direction in which the first option group area is to be operated, a second direction in which the second option group area is to be operated, and a third direction different from the first direction in which the first option group area is operated;
      when detecting that the slide operation is performed in the third direction, displaying a third search criterion in the first option group area, the third search criterion being an option of an upper hierarchy or a lower hierarchy of an option of the first search criterion indicated by the predetermined number of the first option areas included in the selection area before the slide operation is performed in the third direction, and the third search criterion being displayed in the first option group area so that the predetermined number of the first option areas included in the selection area indicate the third search criterion after the slide operation is performed in the third direction; and
      displaying a search result retrieved based on (i) the third search criterion indicated by the predetermined number of the first option areas included in the selection area and (ii) the second search criterion indicated by the predetermined number of the second option areas included in the selection area,
   wherein the first option group area and the second option group area are arc-shaped, and wherein the search result is displayed in a search result display area that does not include the selection area.

* * * * *